Oct. 21, 1941.  J. P. CERVENY  2,259,613
STROBOSCOPIC METER TESTER
Filed March 8, 1939    3 Sheets-Sheet 1

James Paul Cerveny
INVENTOR

Oct. 21, 1941.  J. P. CERVENY  2,259,613
STROBOSCOPIC METER TESTER
Filed March 8, 1939  3 Sheets-Sheet 3

INVENTOR

Patented Oct. 21, 1941

2,259,613

UNITED STATES PATENT OFFICE 2,259,613

STROBOSCOPIC METER TESTER

James Paul Cerveny, Yakima, Wash.

Application March 8, 1939, Serial No. 260,603

1 Claim. (Cl. 176—124)

The invention relates to improvements in rotating meter testing equipment whereby a change in an electric charge, or an impedance value, may be made useful in performing stroboscopic meter testing and other forms of stroboscopic study of motion: also, to improvements in an associated electric network therefor, among the objects of the invention are:

First, to provide a simplified stroboscopic equipment which eliminates the use of photocells, light sources, and optical systems.

Second, to provide a rotating capacitor element, opposed by fixed capacitor elements, in combination with an electric network whereby a small change in the capacity in one part of the network will control a very much greater but related change in another part of the same network.

Third, to provide means to make use of the charge and discharge of an electric condenser, suitably amplified by an electronic network, to cause a glow lamp to glow in relation to the speed of a disc and the number of capacitor elements mounted thereon.

Fourth, to provide means to make use of the variation of impedance of a varying capacitor element in an electronic network wherein a small change in the capacitor values in one part of the electronic network may be used to control a relatively large variation in current through another part of the same network.

Fifth, to provide an improved electric network in which a small change in one of the circuit constants of one part of the network will cause and control a similar but magnified response in another part of the same network.

In general, the invention relates to oscillating vacuum tube circuits which are placed in a stable but critical operating state by neutralization, in which state said oscillation generator is placed under the influence and control of an associated energy feed-back means, and special means in the energy feed-back circuit to control said state. The change in the state is manifest by one or another of several separate but related manifestations.

In some of the present meter testing apparatus the current coil of a standard meter whose disc speed is known to be correct is connected in series with the current coil of the meter under test; the potential coils are similar and in parallel. They then have the same torque applied. When the meter under test is out of adjustment, its retarding torque is not the same as that of the standard meter and adjustment is made to correct for the error, evidenced by a different number of revolutions of the discs in the time allowed the discs to revolve. With this type of equipment it is necessary to count a definite number of revolutions each time an adjustment is made and considerable time is thereby involved in completing a test.

In a stroboscopic type of tester the disc of the meter under test is properly marked, then illuminated by a light whose flashes are controlled by the speed of the disc of the standard meter. When their speeds are identical the illuminated marks appear stationary or adjustment may be made continuously until the marks do appear stationary. The continuous check and adjustment thus possible eliminate time consumed by frequent error and the former count-and-check method.

There is a stroboscopic meter tester in present use which utilizes an equally spaced series of holes through which light is allowed to impinge on a photo-electric surface to develop a low voltage which is amplified by a succession of vacuum tubes to control the glow of a lamp which illuminates the marks on the disc of the meter under test. The system is bulky and expensive. In my invention the glow light is controlled by a capacitor element rotating in relation to a fixed element which operates as a trigger for an associated electric network.

Changes in the plate current of the vacuum tube may be put to many and varied uses; the direct current component of the current fed to the plate, through a resistance, by the source of power may be used to bias additional tubes. The alternating current component of the current fed to the plate, which is caused to vary in relation to the character of the energy fed back by a varying control of the energy feed-back element, may be used to operate a grid glow tube or to energize the grid of succeeding tubes all as herein demonstrated or as hereafter specifically enumerated and as claimed.

An example of a specific embodiment of apparatus within the purview of the invention is illustrated in the accompanying drawings, in which Figure 1 is a side view of a capacity unit and the normal rotating elements of a meter standard.

Like reference characters designate like parts throughout the drawings.

Figure 1:
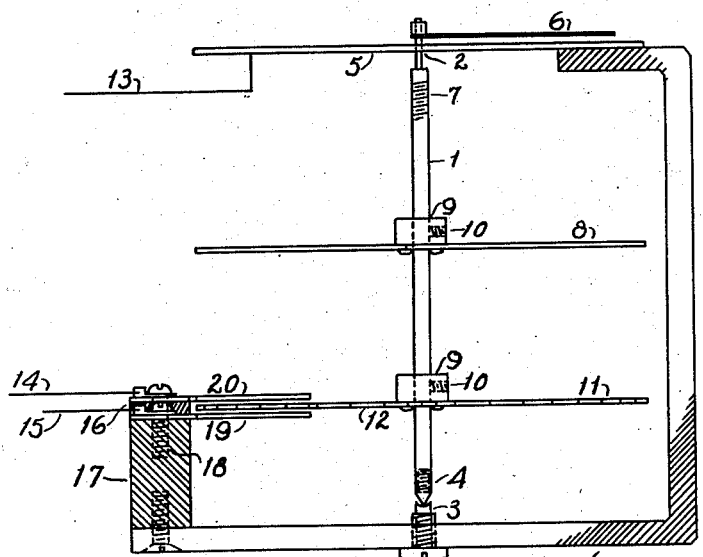
Figure 2:
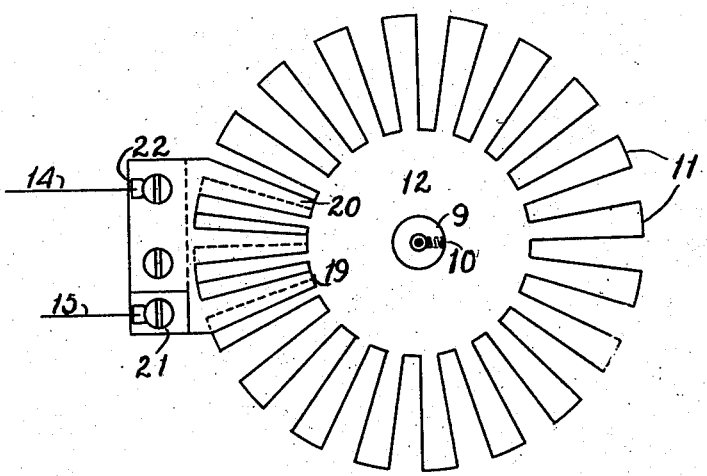
Figure 2 is a top view of the capacity elements only.

Referring to Figure 1, which is a controlling capacity acting as a trigger to control an associated electric network, part 1 is a shaft rotating between an upper bearing 2 and a lower bearing 3 and supported upon a pivot 4. Normally shaft 1 is caused to rotate by the reaction of currents induced in a disc 8 by a current coil which is not shown, as said current coil does not constitute a part of this improvement. Disc 8 is fastened to a hub 9 and both locked in place by a set screw 10 on the shaft 1. Shaft 1 carries a pointer 6 which revolves over a dial 5 calibrated to read in degrees of angle or in parts of a revolution. Shaft 1 carries an additional disc 12, usually made of a light metal such as aluminum and held in its proper position by a similar hub 9 and set screw 10. The disc 12 is milled as shown to form a multiplicity of capacitor segments 11, 11, etc., entirely around its periphery as shown in Figure 2. As disc 12 revolves, carrying capacitors 11, 11, etc., they pass between a set of opposed capacitor elements 19 and 20, which are mounted on an insulator 17 and rigidly held in place by a frame supporting the shaft bearings 2 and 3. Capacitor elements 19 and 20 are separated by a spacer 16 which may be either an insulator or a conductor as may be desired. Screws 18 hold capacitor elements 19 and 20 in position on insulator block 17. Electric connection with an appropriate electric network is made through connectors 13, 14, and 15 and solder lugs 21 and 22 as hereinafter described.

Segments 11 rotating between fixed plates 19 and 20 form a variable condenser. It is obvious that more than one method of making suitable connections between the members 19 and 20 and to an electric network exist. For instance, it is possible to connect plates 19 and 20 together in parallel by connecting connectors 14 and 15 together to form a single capacitor element. In such case the electric circuit includes lead 13 through dial 5 thence through bearing 2 to shaft 1 to metallic disc 12 to the rotating capacitor elements 11 thence by capacity coupling to opposed capacity plates 19 and 20 through solder lugs 21, 22 to wires 14 and 15 to an external network and back to lead 13.

In certain classes of work it may be desirable not to use shaft 1 as a direct conductor in the electric circuit; in which case it will be desirable to complete the electric circuit through wire 14, through lug 22 to capacitor element 20 thence by capacitive induction through the rotating elements 11 to capacitor element 19 to lug 21 and wire 15 to the external electric circuit and returning to wire 14. In such a case it is convenient to insulate disc 12 from shaft 1 by suitable means.

From the foregoing description of the rotating capacity elements 11, it is apparent that they may be formed on a separate disc 12 or may be a part of the usual rotating disc element of a meter standard. Furthermore, elements 11 need not necessarily be shaped as shown in Figure 1 and Figure 2, or mounted in the same plane as the disc 12 but may be formed, or mounted, in any suitable manner to effect a capacity unit or condenser whose capacity will be varied in a predetermined manner when said unit is rotated.

It is also apparent that said capacitor may be formed by several of said discs in parallel, each carrying the same arrangement of capacitor elements formed around the disc's periphery, opposed by suitably formed capacitors arranged in such manner that their faces are utilized electrically in the most effective manner.

An electric impulse is set up by an alternating potential between the plates forming the capacitor, which causes an electric charge to flow while momentarily charging and discharging said capacitor. This charge, flowing through an appropriate electric network, properly amplified, may be caused to control the frequency of light emanating from a gas filled glow tube, or similar device, by varying the electric potential between the glow tube elements from a value insufficient, to a value sufficient, and vice versa, to set up an ionic disturbance in the gas filled chamber and hence cause a periodic glow in relation to the relative position of one or more of the rotating capacitor elements 11, to those capacitor elements 19, 20, opposed, for the purpose of illuminating a series of marks on a rotating meter disc, thereby permitting a continuous adjustment of the meter under test by stroboscopic means. It is apparent that the number of pulsations of light emanating from the glow tube is a function of the speed of the rotating element 12 and the number of capacitors 11 formed, or carried thereon. Furthermore, it is clearly seen that such a capacitor unit will function in the normal manner of capacitors. That is, it may be made a complete capacitor unit by itself or it may be a section in series with, or parallel with, other capacitor units.

Figure 3:
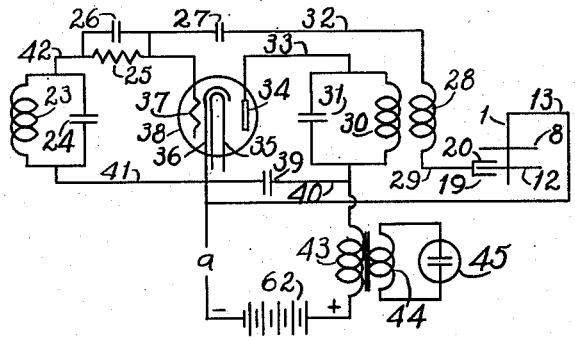
Figure 3 is a diagram of a suitable electric network.

A suitable electric network which may be used to translate the change in electric charge, or change in impedance values as the rotating capacitor passes adjacent to the fixed capacitor element is shown in Figure 3. While the circuit shown is that of the conventional tuned-grid tuned-plate vacuum tube oscillation generator this is merely for the sake of illustration and other oscillating vacuum tube generators may be used.

Figure 3 shows a circuit including an oscillation generator 38, having a grid 37, a plate 34, a heater 35, and a cathode 36. Connected to the cathode 36 by lead 41 is a filter consisting of an inductance 23 in combination with a condenser 24. Said filter is further connected by lead 42 to a grid leak 25-condenser 26 combination, used to maintain an operating bias on the tube grid and is directly connected to grid 37. The self biasing means in combination with the high grid circuit impedance is responsible for the sharp, clean response of the circuit shown in Figure 3. Also, cathode 36 connects directly to capacitor 39, thence by lead 40 to the plate inductance 30 in combination with capacitor 31. Said inductance 30-capacitor 31 combination is further connected by lead 33 to plate 34 of the oscillation generator or tube 38. The circuits just described complete the primary, high frequency components of a vacuum tube generator, which when properly connected to a proper source of power 62, will normally oscillate. The amplitude of oscillations will depend upon several factors which will be entered into further on in the specification.

Fundamentally it is the purpose of an oscillator to oscillate at a given frequency, with a given amplitude of oscillation, at which time the current drawn from its source of supply is a constant value. When the oscillator oscillates more violently or with greater amplitude, the current drawn from its power supply is reduced and vice versa. Therefore, when oscillations in the filter circuit 30, 31 cease, a maximum current value through inductance 43 is reached and when oscillations have reached their greatest value a minimum value of current is drawn from the source of supply 62 whose negative terminal is connected to the cathode 36 of tube 38 and whose positive terminal is connected through inductance 43 through inductance 30 to lead 33 and to plate 34 of the tube 38. A change in the current supplied plate 34 of tube 38 by the plate power supply source which is shown as a battery 62 may be evidenced in the coil 43, placed in inductive relation with coil 44 which is connected to a glow tube or other device 45. A changing current flows through inductance coil 43 which induces a voltage in the coupled inductance 44 which will ordinarily ionize the gas between the electrodes of glow tube 45 for the purposes previously outlined. The magnitude of the voltage developed depends upon several factors, such as the type of tube 38, coefficient of coupling between inductances 43 and 44 or the change in the current values through inductance 43. It is desirable, at times, to use a small tube 38, in which case it is advantageous to amplify, by the usual means, said voltage developed across inductance 43 to increase it sufficiently to cause glow lamp 45 to glow.

Inductance 43 inductively coupled to inductance 44 and the glow lamp 45 may be inserted in the cathode side of the power circuit as at $a$ equally as well as in the plate circuit, as shown. When very small amounts of power are desired it will be advantageous to insert the glow lamp in the grid-to-cathode circuit, as by opening lead 41 and making connections to the glow lamp at the place opened.

Figure 4:
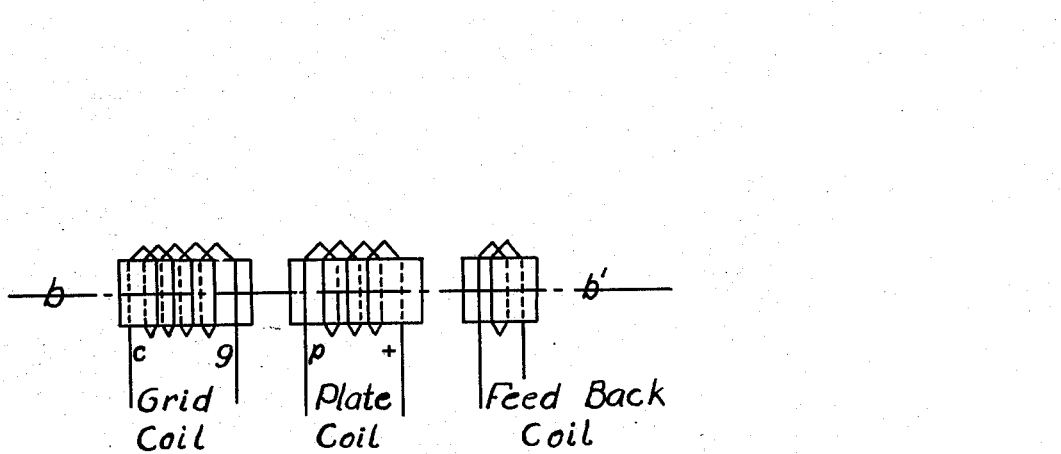
Figure 4 shows a means of winding coils to effect neutralization and the coil relationships to the tube elements.

To effect a critical state from which to control the value of the plate current it is necessary to neutralize the inherent feed-back requirements of the oscillation generator, shown in Figure 3. In the embodiment shown in Figure 3, this may be done by winding inductance 23 and inductance 30 as shown in Figure 4, wherein the fields aid each other but the coils are wound with small wire so that their respective losses maintain oscillations at a predetermined value between the maximum and the minimum amplitude values. Control of the plate circuit values is then effected by a circuit connecting grid 37 with condenser 27 thence by lead 32 through inductance 28 which is placed in inductive relation with inductance 30, thence by lead 29 to capacitor elements 19, 20, coupled to rotating capacitor elements 11 carried by disc 12, thence by shaft 1 which forms a part of the connecting circuit to lead 13 and back to the cathode 36 of the tube 38 in the controllable oscillator means; where variations in the capacity formed by capacitor elements 19, 20 with the rotating element 11 control the state of the oscillating circuit and hence the current through inductance 43 to which is coupled the glow tube 45.

As shown in Figure 3, the control unit is in the feed back circuit, yet it must be clear that control may be obtained by varying the impedance values which may be used to unbalance the state of balance previously set up, that is, the impedance values in the grid-to-cathode circuit or in the neutralizing circuit when that circuit is available.

It is desirable, at times, to obtain neutralization by winding the grid coil 23 and the plate coil 30 so that their fields oppose each other and so separated along axis $b-b'$ as shown in Figure 4 that the circuit just fails to oscillate; or preferably, the coils 23, 30 may be wound (usually with high losses) so that the fields aid one another, and so placed as to just fail to sustain oscillations in the proper circuits. In these instances the feed-back circuit may be used to feed energy so as to cause oscillations to occur at the proper times. For convenience, the feed-back coil of Figure 4 is shown separate from the plate coil, but it is usually placed co-axially inside the plate coil winding in a fixed relationship with the inductively coupled plate coil. It is desirable at other times, to wind coils 23, 30 which are then so placed as to just cause oscillations to occur, in which instance the feed-back circuit may be used to feed energy of the proper phase and amount to cause oscillations to cease (or increase and decrease) at the proper times to cause the glow lamp 45 to periodically illuminate the marks on the disc of the meter under test.

When wound as just described and as shown in Figure 4 it is customary to wind the coils so the ends directly connected to the grid connection $g$ and plate connection $p$ are placed on the inside between the coils where they are less influenced by outside fields. This may be accomplished by winding one coil with the wire wound in a direction opposite to the direction of the other coil. That is, when one coil is wound in a clockwise direction the other is wound in a counter-clockwise direction as shown in Figure 4.

For the purpose of clarity it may be well to re-capitulate: In the diagram of Figure 3, the feed back of energy to permit oscillation of the generator tube 38 is transferred from the plate 34 to the grid 37 through the inherent grid to plate capacity of the tube 38. This feed back is then neutralized by the placement of the grid coil 23 with respect to the plate coil 30 so that the interaction of their respective fields just supports weak continuous oscillations. The circuit is then balanced at its operating point. Variations of the effective impedance of the auxiliary feed-back circuit which has a pick up or feed-back coil 28 inductively coupled to the plate coil 30 and connected (with a control mechanism in series relationship to cause said variation in effective impedance) between the cathode 36 and the grid 37 control the amplitude of the oscillations and hence the current flowing in the oscillatory circuits and the current drawn from the source of power 62 through the associated glow lamp.

For convenience in adjustment, condenser 27 may be made variable or may be a fixed capacitor in parallel with a small variable capacitor.

I claim:

A stroboscopic meter testing system comprising an integrating watt-hour meter having a watt-hour registering means, a plurality of fixed current and potential coils, and a rotatable shaft in said meter responsive to the magnetic interaction between related current and potential coils to rotate said shaft; variable capacity means responsive to the rotation of said shaft to vary the capacity thereof, an oscillatory circuit having a gaseous glow lamp in the output thereof, and including said capacity means, for varying the energization of said lamp periodically in accordance with the rotation of said shaft.

JAMES PAUL CERVENY.